United States Patent [19]
Engebretson

[11] Patent Number: 4,472,884
[45] Date of Patent: Sep. 25, 1984

[54] BOREHOLE AZIMUTH DETERMINATION USING MAGNETIC FIELD SENSOR

[75] Inventor: Harold J. Engebretson, Yorba Linda, Calif.

[73] Assignee: Applied Technologies Associates, San Marino, Calif.

[21] Appl. No.: 338,261

[22] Filed: Jan. 11, 1982

[51] Int. Cl.³ .............................................. G01C 19/38
[52] U.S. Cl. ....................................... 33/304; 33/312
[58] Field of Search .................................. 33/301–303, 33/304, 310, 312, 313

[56] References Cited

U.S. PATENT DOCUMENTS

| | | | |
|---|---|---|---|
| 1,928,969 | 10/1933 | Kuffel | 33/302 |
| 2,635,349 | 4/1953 | Green . | |
| 2,674,049 | 4/1954 | James, Jr. . | |
| 2,681,567 | 6/1954 | Widess . | |
| 2,806,295 | 9/1957 | Ball . | |
| 3,037,295 | 6/1962 | Robertson . | |
| 3,052,029 | 9/1962 | Wallshein . | |
| 3,137,077 | 6/1964 | Rosenthal . | |
| 3,241,363 | 3/1966 | Alderson et al. . | |
| 3,308,670 | 3/1967 | Granqvist . | |
| 3,561,129 | 2/1971 | Johnston . | |
| 3,753,296 | 8/1973 | Van Steenwyk . | |
| 3,862,449 | 1/1975 | Isham et al. | 33/312 |
| 4,021,774 | 5/1977 | Asmundsson et al. | 33/304 X |
| 4,199,869 | 4/1980 | Van Steenwyk | 33/304 X |
| 4,265,028 | 5/1981 | Van Steenwyk | 33/304 |

Primary Examiner—Harry N. Haroian
Attorney, Agent, or Firm—William W. Haefliger

[57] ABSTRACT

A well mapping apparatus comprises:
  (a) a magnetic field sensing device whose output is proportional to a local magnetic field vector,
  (b) an acceleration sensing device whose output is proportional to a local gravity vector,
  (c) the devices supported for rotation about a common axis, in a borehole,
  (d) the outputs being usable in the determination of azimuth and inclination of the borehole.

2 Claims, 7 Drawing Figures

BOREHOLE AZIMUTH DETERMINATION USING MAGNETIC FIELD SENSOR

BACKGROUND OF THE INVENTION

This invention relates generally to surveying of boreholes, and more particularly concerns apparatus and methods to determine azimuth and tilt, employing magnetic means to determine azimuth. This invention also relates to detecting errors in magnetic azimuth, local magnetic anomalies, or nearby magnetic objects.

It is known to use an angular rate sensing gyroscope and an accelerometer in a rotating gimbal to detect both the earth's rotation rate vector and the gravity vector. Each instrument provides an output that is proportional to the vector dot product between the sensor input axis and its associated reference vector, plus certain error terms. Analysis shows that borehole tilt and azimuth may be computed from these sensor outputs, and that the gimbal rotation makes it possible to both measure all required data with only one sensing axis of each kind and to eliminate major bias type error sources from the sensors.

Also, it is known to use magnetometers in borehole surveys; however, no way was known to employ a single magnetometer to determine azimuth, in the unusually advantageous manner as described herein.

SUMMARY OF THE INVENTION

It is a major object of the invention to provide method and apparatus wherein a magnetic field sensing device may be employed in an advantageous manner and along with an accelerometer, to provide outputs usable in determination of borehole azimuth and tilt at instrument locations in the hole. Also provided are secondary usable outputs indicating errors in magnetic azimuth, local magnetic anomalies, or nearby magnetic objects. Basically, the apparatus comprises:

(a) a magnetic field sensing device whose output is proportional to a sensed component of the local magnetic field vector, (b) an acceleration sensing device whose output is proportional to a sensed component of the local gravity vector, (c) means supporting such devices for rotation about a common axis, in a borehole, and (d) the outputs being usable in the determination of azimuth and inclination of the borehole.

As will appear, the above devices may be simultaneously rotated about the common axis, and circuitry is provided to receive the device outputs to derive azimuth and inclination of the borehole; apparatus may be provided to receive the output of the magnetic field sensing device (as for example a magnetometer) to provide an harmonic analysis of the output, whereby errors in azimuth determination, local magnetic anomalies, or nearby magnetic objects may be detected; the angularity of the field sensing device and/or that of the accelerometer may be canted to improve the output signal, as for example its amplitude; a second magnetic field sensor may be provided and connected to assist in determining field gradient; and an inertial angular rate sensor may be coupled with the instrumentation, for purposes as will appear.

These and other objects and advantages of the invention, as well as the details of an illustrative embodiment, will be more fully understood from the following description and drawings, in which:

DRAWING DESCRIPTION

DETAILED DESCRIPTION

Figure 1:
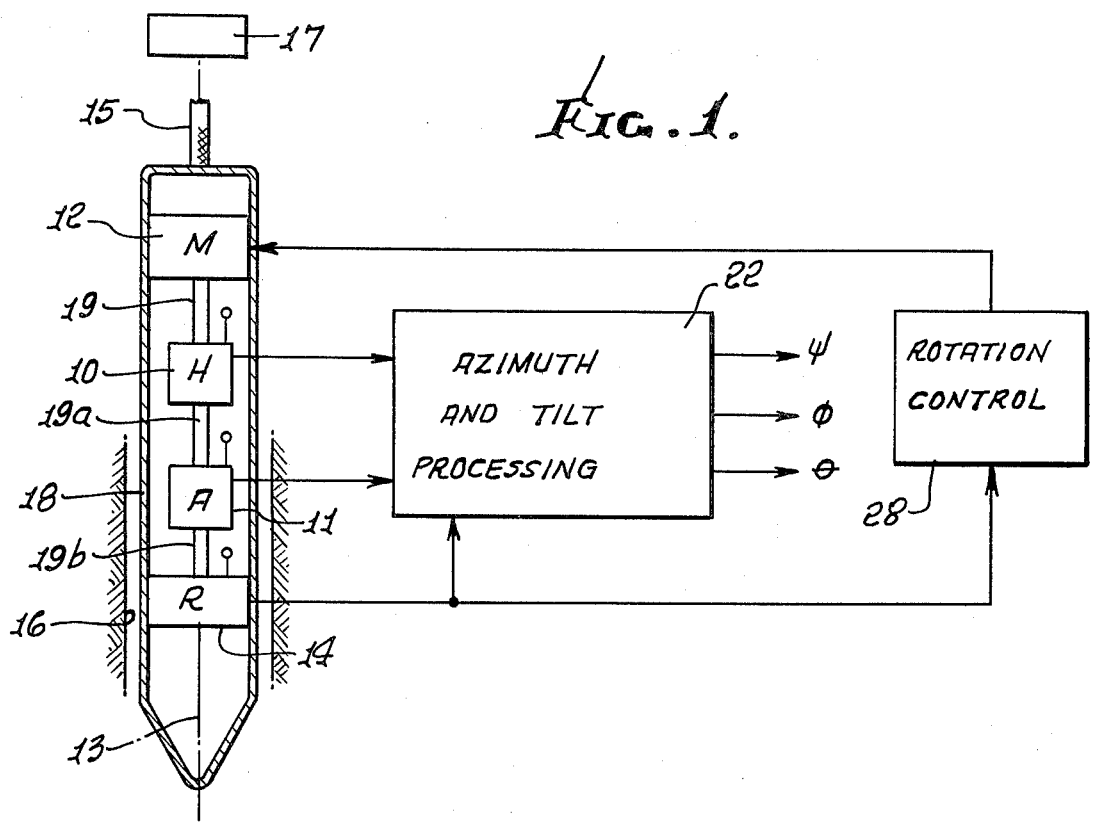
FIG. 1 is an elevation taken in section to show one form of instrumentation employing the invention.

Consider first an arrangement as shown in FIG. 1. The arrangement comprises first a magnetic field sensing device 10 (or magnetometer) whose output is proportional to a local magnetic field vector; second, an acceleration sensing device 11 whose output is proportional to a local gravity vector; and third, a means 12 to rotate these devices about an axis 13 which will generally be along a borehole axis. The means to provide rotation may, for example, be a geared timing type motor to provide continuous rotation, or a servoed type motor working with an angle sensor about the rotation axis to provide either continuous rotation or discrete positioning. These devices, along with a resolver 14, are located in a container or carrier 18 that is suspended by cable 15 in a borehole 16, and traveled therein by surface means 17. Motor output shaft 19 has extensions at 19a and 19b to rotate devices 10 and 11, and provide input to the resolver which is also tied to the container. See also FIGS. 1 and 6 in U.S. patent application No. 293,159 filed Aug. 17, 1981.

For this configuration, both the magnetic field andacceleration sensing devices 10 and 11 (i.e. H and A) have single axes of sensitivity, nominally positioned parallel to each other and normal to the rotation axis 13. As the combination of sensing devices is rotated about its rotation axis 13 in a borehole, both the magnetic field sensing and acceleration sensing devices 10 and 11 will produce variable output indications proportional to the vector dot product of a unit vector along the respective input axis and the local magnetic field vector and gravity vector respectively. For continuous rotation operation at a fixed location in the borehole and a uniform earth's magnetic field, these signals will be sinusoidal in nature. For discrete step rotation, the sensor output will be just the equivalent of sampling points on the above mentioned sinusoidal signals. Thus, from a knowledge of sample point amplitudes and position along the sinusoid, the character of an equivalent sinusoid in amplitude and phase may be determined.

The output sinusoidal signals from the acceleration sensing and magnetic field sensing devices may be combined and processed as in circuitry indicated at 22, and which may be located in carrier 18 or at the surface to provide the azimuth direction of the borehole axis with respect to the vertical plane containing the direction of the local earth's magnetic field. The output signal from the acceleration sensing device 11 alone may be used to determine the tilt or drift of the borehole axis with respect to the local gravity field vector. Such determinations of directional azimuth and tilt or drift from vertical are free of any constant or bias type errors of the sensing devices.

The combination of elements as described above is considered as superior to such other rotatable magnetometer systems as disclosed in U.S. Pat. No. 4,174,577, since there is in the present case no requirement for a flexible drive shaft, or for the two axis pendulous gimbal system required to maintain the magnetometer so that it only senses the horizontal component of the earth's magnetic field. Also, the use of an acceleration sensing device of any desired accuracy can provide much improved direction and tilt measurement than those obtainable from a self-pendulous approach.

It should be noted that the signal processing used to derive azimuth direction and tilt or drift from the sinusoidal signal outputs from the magnetic field and acceleration sensing devices 10 and 11 is essentially identical to that disclosed in U.S. Pat. No. 3,753,296 to Van Steenwyk in which a single axis gyroscope is employed rather than the magnetic sensing device of the present invention. Note in this regard that the present configuration provides azimuthal direction with respect to the plane containing the local earth's magnetic field vector, whereas the apparatus in the Van Steenwyk patent provides azimuthal direction with respect to true north as defined by the earth's rotation rate vector. Circuitry 28 connected in feedback relation between resolver 14 and motor 12 controls the latter in response to resolver output.

Figure 2:
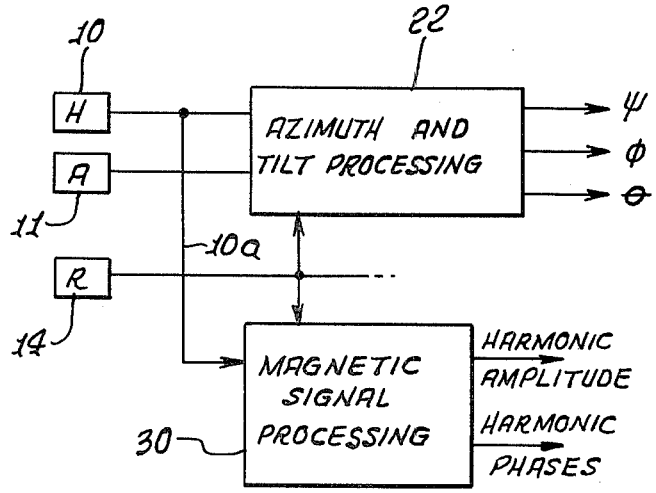
FIG. 2 is a circuit block diagram.

The addition of a magnetic signal processing means 30 which may be located in carrier 18 or at the surface is shown in FIG. 2. It receives the output of device 10 via lead 10a and processes same to provide an harmonic analysis of the magnetic sensor output signal. Thus means 30 is an harmonic analyser, having amplitude and phase output. If the local magnetic field is solely that of the earth's field, the output waveform is a sinusoid at the frequency of rotation of shaft 19, and the sinusoid amplitude should match that of the sensed component of the assumed known earth's magnetic field. Any observed deviation of the magnetic signal from the above described ideal is an indication of some anomalous magnetic field condition that may influence the accuracy of the magnetically determinable azimuth direction. Analysis of the frequency and amplitude characteristics of the deviations from the ideal earth's magnetic field may be used to quantify the probable errors of such magnetic azimuth determination. Such magnetic signal processing can be by either a commercial analyzer or special purpose circuits.

Figure 3:
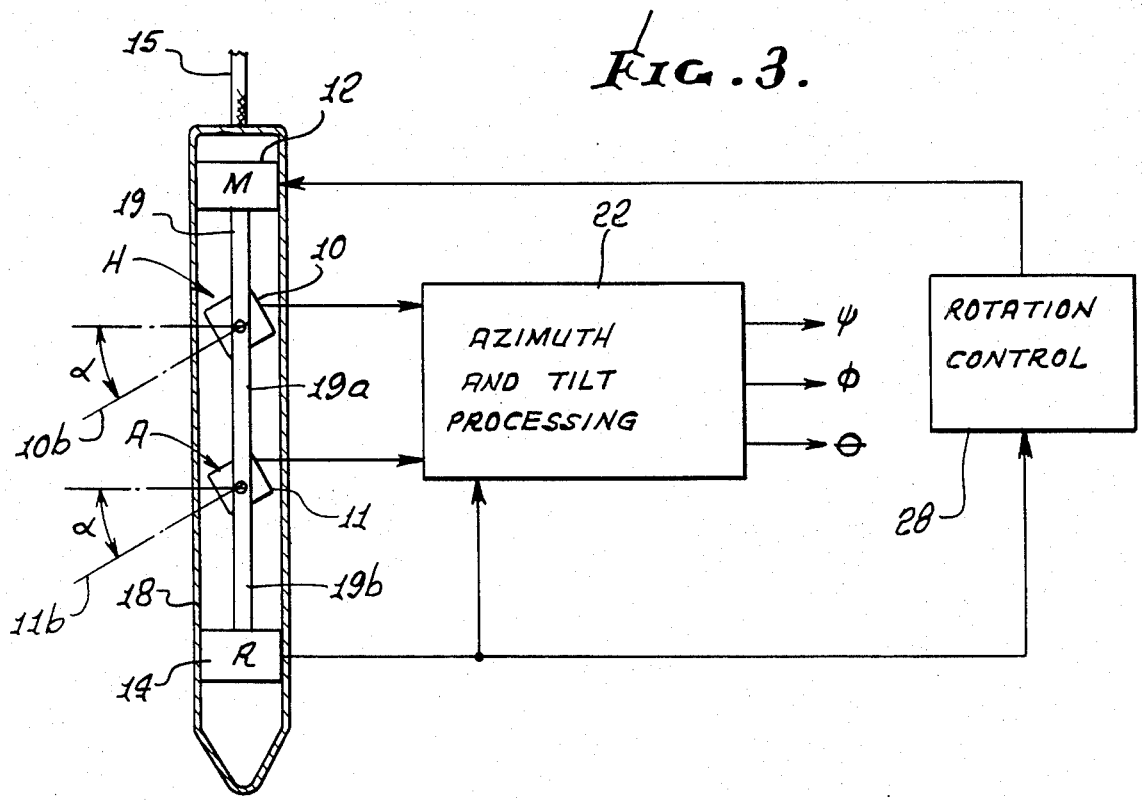
FIG. 3 is a view like FIG. 1, but showing modified instrumentation.

A further aspect of the invention concerns canting the input axis or axes 10b and 11b of either or both of the sensing devices 10 and 11 by a selected angle, α, as shown in FIG. 3. That angle may be fixed for a given configuration or may be variable within a given configuration. The cant angle may be typically on the order of 10 to 30 degrees, but variable angle arrangements can provide capability for variation as great as 0 to 90 degrees. The introduction of a cant angle adds the capability to measure three orthogonal components of either the gravity field or magnetic field with the previously described single axis sensors. The components normal to the rotation axis continue to be determined error free. When the apparatus is periodically operated with the cant angle adjusted to zero, the true sensor bias error may be determined. If, subsequently, the cant angle is adjusted to an angle such as 10 or 20 or 30 degrees, measurements free of fixed bias type errors may be made for all three components of the sensed quantity.

Figure 5:
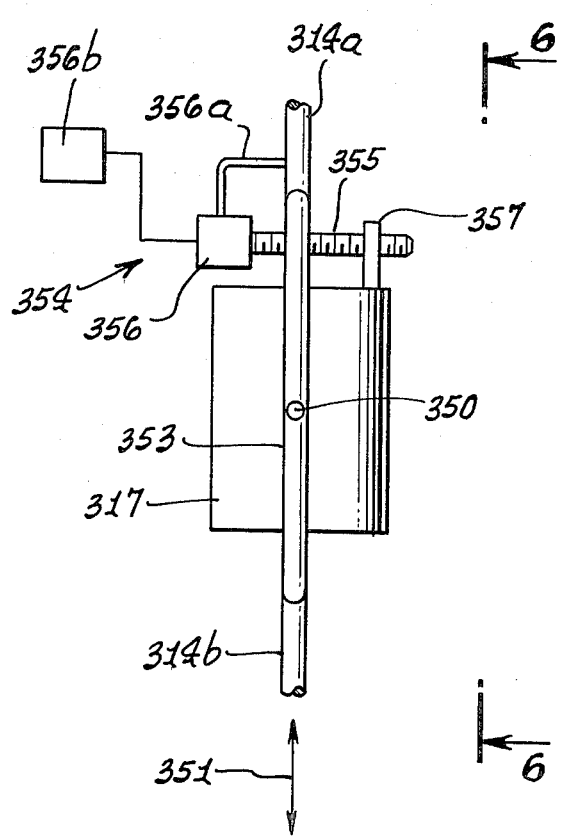
FIG. 5 is a fragmentary elevation showing variable cant mechanism as usable in the FIG. 3 instrumentation.
Figure 6:
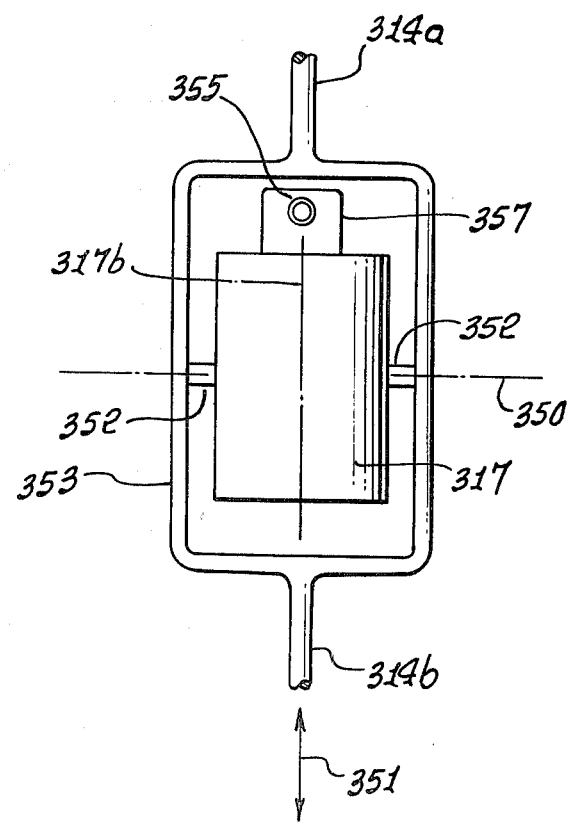
FIG. 6 is a side view taken on lines 6—6 of FIG. 5.

FIGS. 5 and 6 illustrate technique for adjusting the angularity of the axis of sensitivity of the accelerometer relative to the lengthwise direction of instrument travel in the borehole. As shown, the accelerometer 317 (corresponding to accelerometer 11) has an axis of sensitivity (input axis) shown at 317b, which is rotatable about an axis 350 which is substantially normal to the direction or travel 351 in the borehole. Shaft extensions 314a and 314b correspond to extensions 19a and 19b in FIG. 1. The accelerometer 317 is carried by pivots 352 in a frame 353 to which shaft extensions 314a and 314b are connected, as shown. Control means 354 is also carried by the frame to adjust the cant of axis 317b, as for example at locations of operation as described above, to improve the determination of azimuthal direction of tilt of the borehole, at "calibration" locations, and/or at other instrument locations in the hole. The control means 354 may, for example, comprise a jack screw 355 driven by a reversible motor 356 suspended at 356a by the frame. The jack screw extends laterally and interfits a nut 357 attached to the accelerometer case, as for example at its top, offset from axis 350. A servo system 356b for the drive may be employed, so that a chosen angularity of axis 317b relative to direction 351 may be achieved. Support or suspension 356a may be resiliently yieldable to allow the accelerometer to be adjustable tilted, without jamming of the drive or screw.

When desired, a system similar to that of FIGS. 5 and 6 may be used to cant the angle of the sensitive input axis of the magnetic field sensing device 10.

Figure 4:
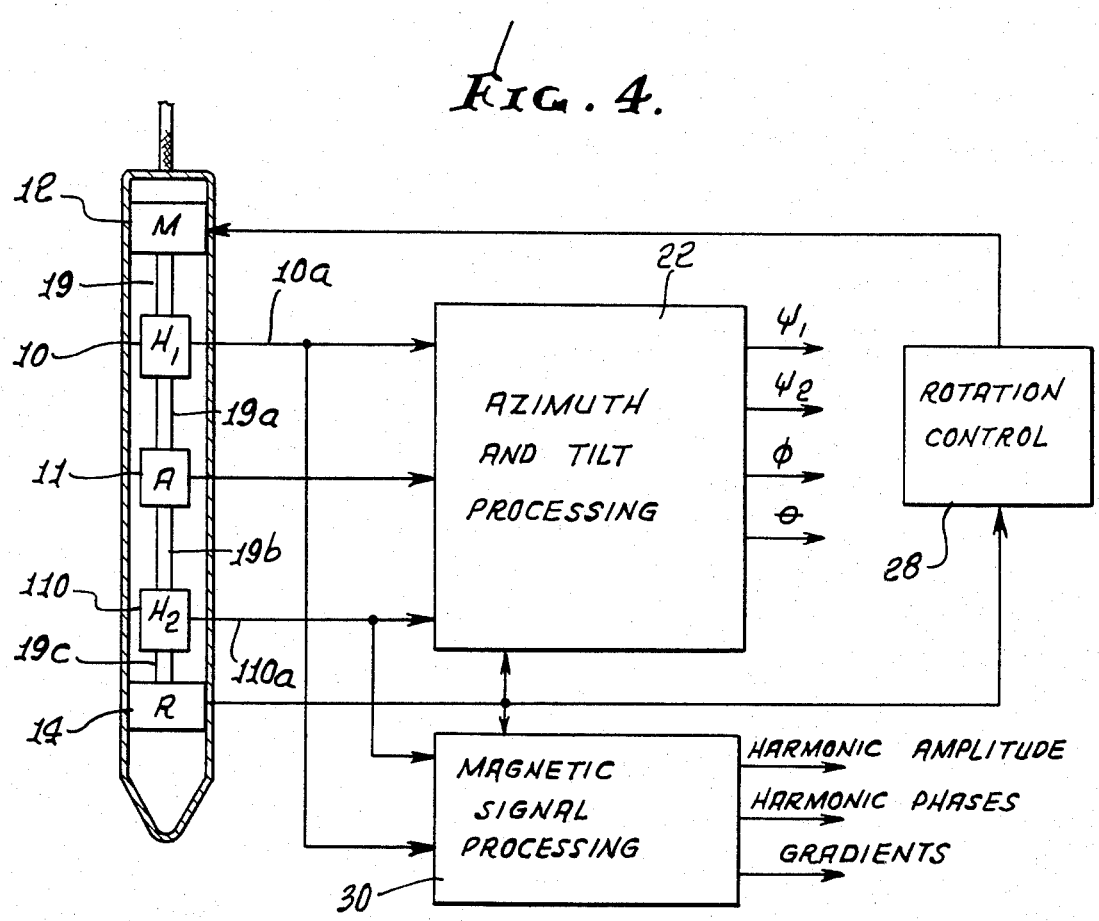
FIG. 4 is another view like FIG. 1, but showing further modified instrumentation, and also a circuit block diagram.

The addition of a second magnetic field sensing device 110 as shown in FIG. 4 provides additional capabilities. First, if operated just as the first magnetic field sensor 10, it provides a second determination of magnetic azimuth direction which may be used to detect error by direct averaging of first azimuth determination $\psi_1$ with the second determination $\psi_2$. Such averaging may be conducted by addition and dividing circuits in block 22

$$\left(\frac{\psi_1 + \psi_2}{2}\right).$$

Alternatively, the device outputs may be averaged, and the result processed to derive an average azimuth. It also provides redundancy such that measurements are still obtainable from device 110 if the first magnetic field sensing device 10 should fail. Most importantly, the second magnetic field sensing device 110 may be used to improve the detection of anomalous magnetic fields in the region of the sensors. Assuming that the only magnetic field in the region of the sensors is that of the earth's magnetic field, both the first and second magnetic fields sensors 10 and 110 produce identical outputs $H(t)_1$ and $H(t)_2$. Since the spacing along the borehole axis is typically on the order of two to five feet, the difference of the two magnetic sensor outputs $H(t)_1 - H(t)_2$ (on leads 10a and 110a) is a measure of the gradient of the local field. With the previously discussed cant angle α for the magnetic sensing device 10 set to zero, gradients $S_1$ of the cross borehole components with respect to the along borehole direction are measured. The gradient $S_2$ of the along borehole component with respect to the along borehole direction is also measured with the cant angle set to α (where α may be up to 90°). As with the single magnetic sensing device arrangement, the individual output signals of both cantable sensors may be analysed by the magnetic signal processing circuit 30 to provide additional detail characterization of any anomalous magnetic fields.

The arrangements described above could also make use of acceleration sensing and magnetic field sensing devices having more than one axis of sensitivity. Both two and three axes of sensitivity may be used to provide increased redundancy for improved reliability or accuracy whenever the increased complexity of such sensors is acceptable.

Although the discussions above concerning the use of harmonic errors of the magnetic sensor outputs or of the availability of gradients of the local magnetic field related to the ability to detect errors in the magnetically derived azimuth output, it is also possible to use these same data as means for determining the proximity of the sensor unit to known or expected anomalous magnetic fields resulting from pieces or parts of magnetic materials or from their effects in distorting the uniform earth's field. Thus such outputs could be used for the detection and direction indication of such elements.

Figure 1A:
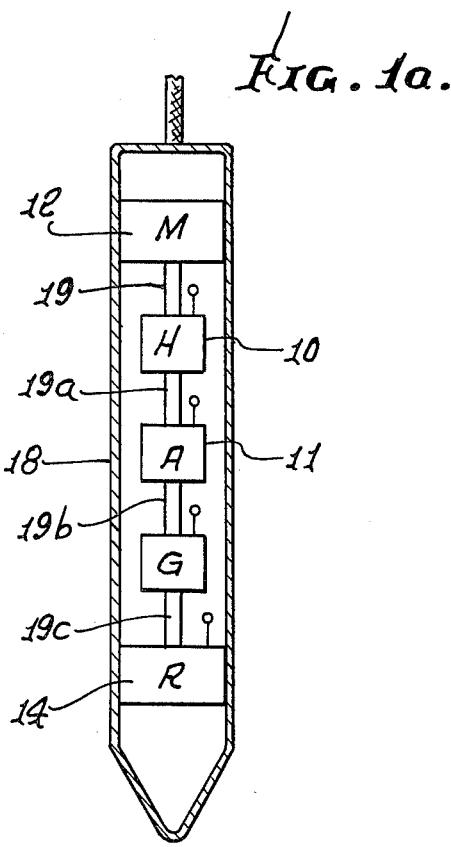
FIG. 1a is a view like FIG. 1.

Another useful combination employs a means indicated at G in FIG. 1a (to be rotated by shaft 19) for sensing angular rate with respect to inertial space in any or all of the arrangements shown in FIG. 1 through 4. Such means can be provided to measure angular rate in one, two, or three axes of an orthogonal coordinate set. See U.S. patent application No. 293,159, referred to above. The inclusion of such an inertial rate sensing device permits the additional measurement of components of the earth rate rotation vector from which an azimuthal direction with respect to a true north direction can be found. This addition provides the capability to survey magnetic variation (the angle between true north and magnetic north), to initialize magnetic direction sensing instruments in relation to true north, or to operate in borehole survey operations or borehole magnetic anomaly detection operations in a precise manner with only one multi-purpose sensing array.

Magnetic field sensing devices (magnetometers) may be of any type, such as flux gate type, Hall effect type, or nuclear magnetic resonance type. The magnetic signal processing function may be supplied to a commercial harmonic analyzer of any type that provides harmonic amplitudes and phases of the input sensor data, or it may comprise special purpose circuits designed as a part of the sensor system.

Examples of usable magnetometers are as follows:

| Model | Manufacturer |
|---|---|
| Magnetometer | Develco, Inc. |

Examples of usable harmonic analysers 30 are as follows:

| Model | Manufacturer |
|---|---|
| 3582A | Hewlett-Packard |
| 5920A | Hewlett-Packard |

In the drawings $\psi$ refers to azimuth; $\phi$ refers to tilt; and $\theta$ refers to high side angle.

I claim:
1. In well mapping apparatus, the combination comprising
(a) a single magnetic field sensing device having only one axis of sensitivity whose output is proportional to a local magntic field vector,
(b) a single acceleration sensing device having only one axis of sensitivity whose output is proportional to a local gravity vector,
(c) means supporting said devices for rotation about a single common axis, in a borehole,
(d) said outputs being useable in the determination of azimuth and inclination of the borehole,
(e) means including a drive motor to rotate said devices about said common axis, in a borehole, and said motor being free of operative feedback drive connection to the acceleration sensing device, the magnetic field sensing device having a fixed angular position relative to said axis, at all times during motor rotation of said devices, and said magnetic field sensing device also being free of operative feedback connection to the acceleration sensing device at all times,
(f) circuitry connected to receive the outputs of said magnetic field sensing and acceleration sensing devices, and to process same to provide signals indicative of magnetic azimuth and tilt of the apparatus,
(g) and a resolver rotated by said motor about said axis and connected in controlling relation with said motor, whereby the motor rotates the magnetic field and acceleration sensing devices in a mode selected from the following modes: i) continuously, and ii) intermittently.

2. The combination of claim 1 that includes apparatus connected to receive the output of said field sensing means for providing an harmonic analysis of said output whereby errors in said azimuth determination, anomalies in the local magnetic field, or nearby magnetic objects may be detected.

* * * * *